Sept. 5, 1950 W. C. NORRIS ET AL 2,520,953

TIME DIVISION DEMULTIPLEXER FOR TELETYPE SIGNALS

Filed July 29, 1946 3 Sheets-Sheet 1

Inventor
WILLIAM C. NORRIS
LAWRENCE R. STEINHARDT
FRED L. RIBE

By M. A. Hayes
Attorney

TIME DIVISION DEMULTIPLEXER FOR TELETYPE SIGNALS

Filed July 29, 1946 3 Sheets-Sheet 2

Inventor
WILLIAM C. NORRIS
LAWRENCE R. STEINHARDT
FRED L. RIBE

By M. O. Hayes
Attorney

Sept. 5, 1950 W. C. NORRIS ET AL 2,520,953

TIME DIVISION DEMULTIPLEXER FOR TELETYPE SIGNALS

Filed July 29, 1946 3 Sheets-Sheet 3

Inventor
WILLIAM C. NORRIS
LAWRENCE R. STEINHARDT
FRED L. RIBE

By M. O. Hayes

Attorney

Patented Sept. 5, 1950 2,520,953

UNITED STATES PATENT OFFICE 2,520,953

TIME DIVISION DEMULTIPLEXER FOR TELETYPE SIGNALS

William C. Norris, Lawrence R. Steinhardt, and Fred L. Ribe, United States Navy

Application July 29, 1946, Serial No. 686,832

3 Claims. (Cl. 178—50)

Figure 1:
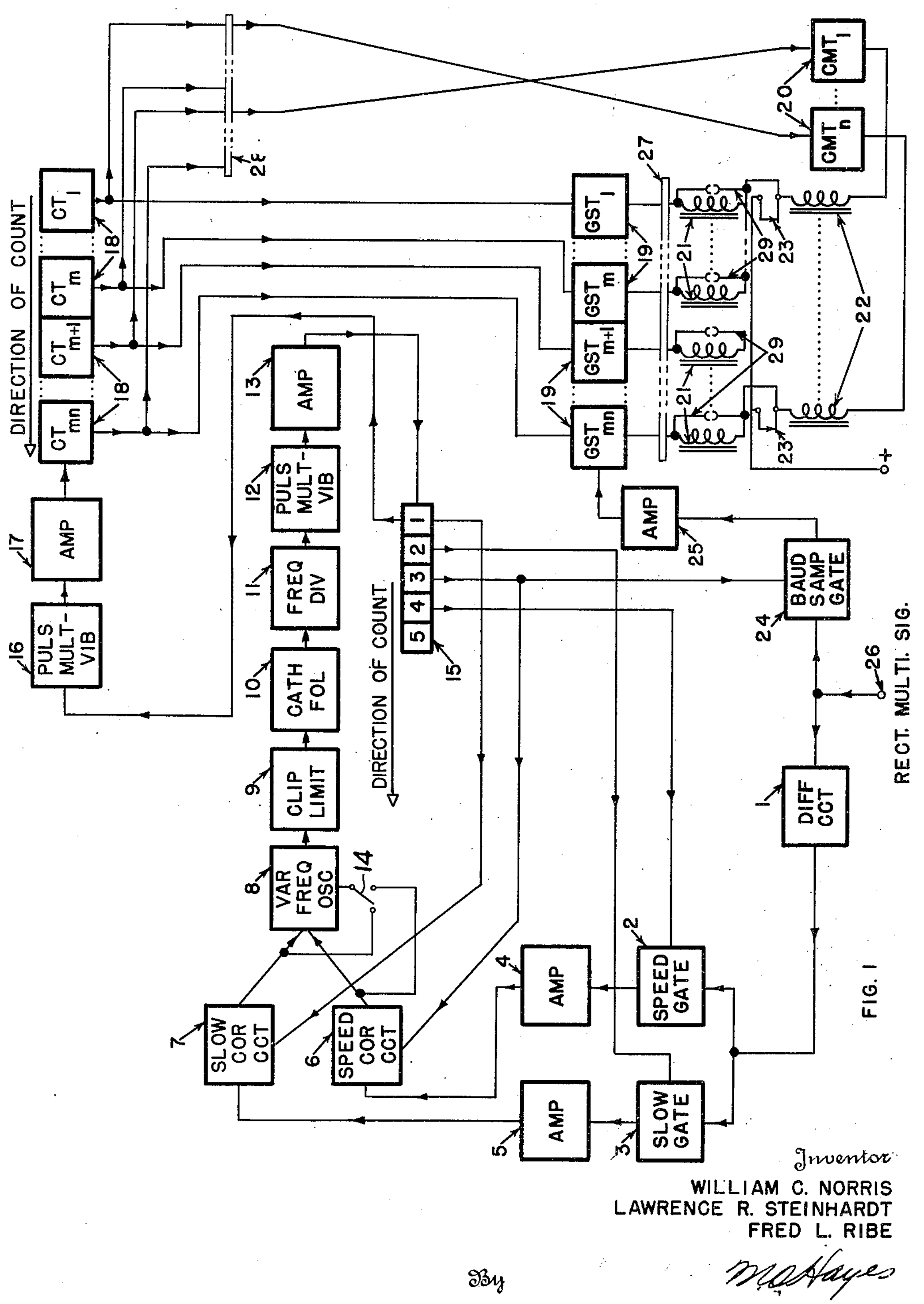

(Granted under the act of March 3, 1883, as amended April 30, 1928; 370 O. G. 757)

This invention relates to a method of demultiplexing multiplexed Teletype signals without the use of mechanical commutators or commutating switches.

In the use of multiplex telegraph systems, need has arisen for a demultiplexer that can be adapted to receive from different transmitters employing different numbers of channels in a time division system.

In the systems of the prior art this has been impossible due to inherent mechanical and electrical limitations in the equipment used.

One object of the invention is to provide a single unit capable of automatically demultiplexing multiplexed Teletype signals of any baud, or impulse, configuration or cyclic speed, subject only to the condition that the bauds of the multiplexed Teletype signal be of equal time duration or that the baud time durations have a least common denominator equal to an integral multiple of the time duration of the smallest baud of the cycle. As used in this specification, a baud is defined as the interval of time necessary to transmit one dot or the impulse or space of shortest duration.

Another object of the invention is to provide for automatically compensating for speed or phase changes in the incoming signal.

A further object of the invention is to provide a sampling system in which only a small portion of the time duration of each baud of the incoming signal is used to allow for slight phase and speed changes of the incoming signal without mistakes in the recorded end product.

Other objects and advantages will be apparent from the following specification in conjunction with the appended claims.

The use of time-division multiplex as a means of transmitting and receiving several signals over a common line by means of synchronized switches or commutators at either end is well-established in multiplex telegraphy. If there are $m_i$ bauds per cycle (character) for each of $n$ signals, then there are $$\sum_{i=1}^{n} m_i$$

segments on each commutator or switch, plus whatever extra number are added for synchronizing or identification. For simplicity it is assumed here that all signals have an equal number of bauds, $m$, and that there are no extra bauds, or segments on the commutators or switches, added. Although this simplification is used throughout in describing the system, the present invention will accommodate the more general case with no change in principle. Thus each commutating cycle is divided into $mn$ equal time intervals. By means of the multiplexing process, the $n$ signals are made to occupy $n$ sequential channels in time just as they originally occupied $n$ separate channels in space. Each time channel recurs cyclically at the same repetition rate as the cycles of the separate signals in space. Conversely, by means of the demultiplexing process, hereinafter described, the $mn$ bauds in sequential time intervals in each cycle of the multiplexed signal are separated into $mn$ space channels and each of the $mn$ bauds is stored, according to its polarity (mark or space) in its appropriate storage circuit. Subsequent to the storage of each baud of the incoming signal cycle in its proper storage element, the $n$ stored signal combinations of $m$ bauds each automatically determine the Teletype character to be printed (or punched on a tape) by each of the $n$ Teletypes (or punches) which they control.

In the present invention a combination of a ring counter having $mn$ counter elements and an arrangement having $mn$ gating-and-storage thyratrons, controlled jointly by the signal bauds and the ring-counter thyratrons is used to replace the commutator or commutating switch used for commutation or switching in existing demultiplexers. The design of ring counters of the type used here, as well as the types of tubes used for gating and storage, are well known by those skilled in the art. Their proper combination for the present purpose, however, is unique.

Figure 1 illustrates the general arrangement of the demultiplexing system by means of block diagram.

Figure 2:
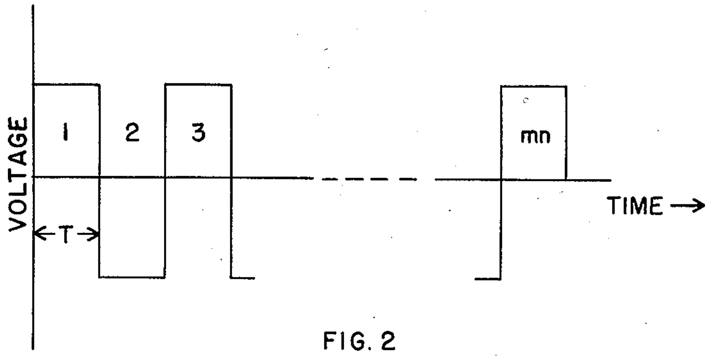
Figure 3:
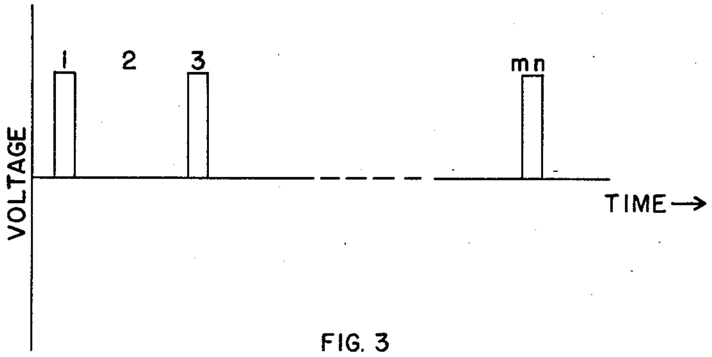
Figure 4:
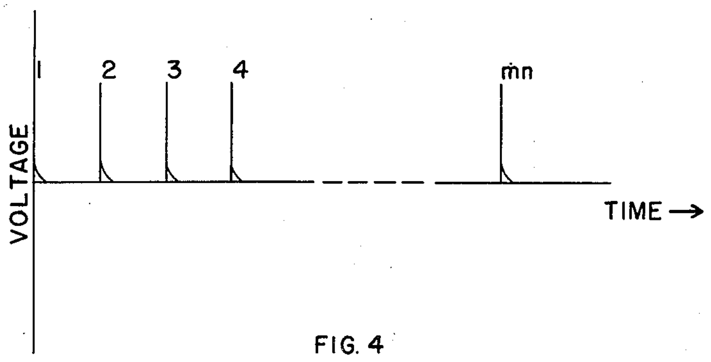

Figures 2, 3, and 4 illustrate waveforms in the system as hereinafter set forth.

Figure 5:
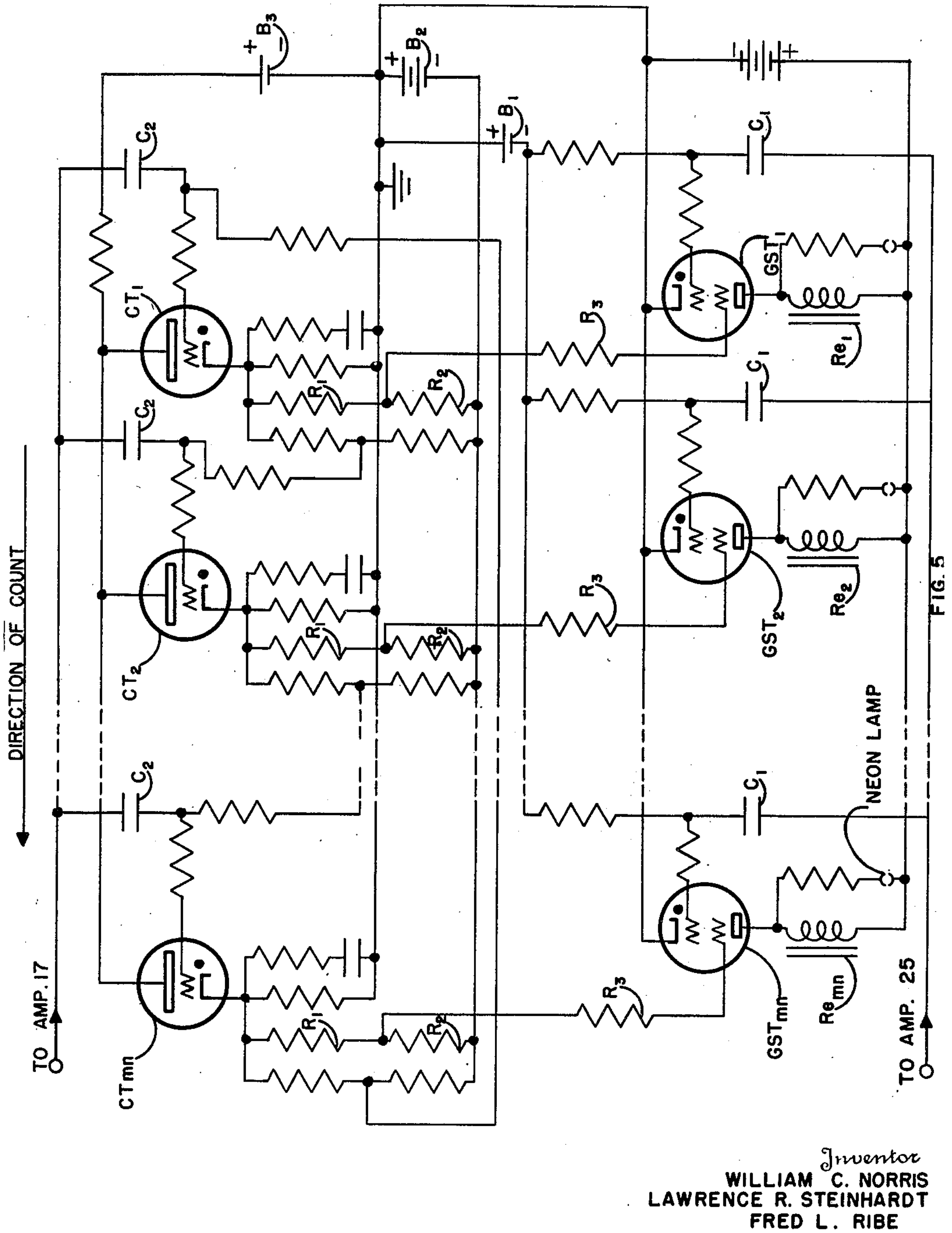

Figure 5 shows the circuit arrangement of the baud separating system.

Referring now to Figure 1, the operation of the system is as follows: The rectified input multiplexed signal is demultiplexed by means of the separator ring counter 18 and its corresponding gating-and-storage tubes 19, and the separated bauds are stored in storage-relay coils 21 which are contained in $n$ tape punches which are used for recording the bauds of the $n$ signals corresponding to the $n$ time channels of the input signal. Included in these $n$ tape punches are $n$ clutch magnets 22, each of which, when excited, releases a rotating cam which causes holes to be punched in the tape of its tape punch according to the excitation of the *m* storage relay coils which are also associated with its corresponding tape punch. Immediately after the punching of the proper holes, the tape is advanced automatically to its next position. Each clutch-magnet coil has associated with it a set of contacts 23 which are closed when the coil is unexcited, making positive battery to the coil itself as well as to the *m* corresponding storage-relay coils of the tape punch. As each clutch magnet coil receives its excitation, it automatically deenergizes its *m* corresponding storage-relay coils as well as itself, thus preparing the storage-relay coils to receive the excitation of the next cycle of the signal.

The wave form of a single cycle of the incoming rectified multiplexed signal is shown in Figure 2. The bauds are shown as consisting of alternately high and low potentials merely for the sake of convenience. According to the signal configuration, they may occur in any sequential combinations of high and low potentials as dictated by the Teletype code used. As shown, these bauds have a recurrence period of T seconds, with a corresponding frequency denoted by *f*.

Units 8, 9, 10, 11, 12, 13, 15, 16, and 17 constitute the control circuits for the separator ring counter 18. Thus the variable oscillator 8 generates a periodic signal of frequency determined by the baud frequency *f*, and the setting of the frequency divider 11. If D is the division ratio of the frequency divider, then the variable oscillator is adjusted to give a frequency of 5D*f*. The signal of this oscillator passes through clipping limiter 9 and emerges in the form of a flat-topped wave having frequency 5D*f*. This wave is fed through cathode follower 10 to frequency divider 11 which may consist of as many stages as necessary to give a division ratio D. A typical type of counter suitable for this purpose is one of the step-changing type which may easily be calibrated, and whose counting division ratio is independent of input frequency over reasonably wide ranges. The wave emerges from the frequency divider in the form of positive pulses of frequency 5*f* and is fed to the pulsing one-kick-type multivibrator 12 whose sharp negative pulses are then fed to amplifier 13. Emerging from amplifier 13 are a train of sharp positive pulses which actuate ring counter 15. The direction of the count (i. e., of the firing sequence of the thyratrons) of this ring counter is indicated as from right to left in Figure 1 by the arrow. This ring counter is made up of thyratrons (or vacuum trigger pairs) 1, 2, 3, 4, and 5. Each tube fires once for each five input pulses received from amplifier 13 and stays fired each time for 1/(5*f*) seconds. The one-kick-type multivibrator 16 receives positive excitation pulses of frequency *f* from tube 1 of this ring counter, and the negative output pulses of this multivibrator are amplified by amplifier 17 to give sharp positive pulses having a frequency *f* as the input to the separator ring counter 18. The wave form of these counter pulses is indicated in Figure 4. They are shown as positive pulses here; although they may also be negative, depending upon the type of separator ring counter used. These pulses occur at instants in time corresponding to the leading edges of the bauds of the input signal shown in Figure 2, and each is labeled with a number corresponding to that of the baud to whose leading edge it corresponds in time. Thus *mn* pulses are shown for a full cycle of the input signal. This condition of coincidence between counter pulses and leading edges of the incoming multiplexed-signal bauds is one which is obtained by initially adjusting the frequency of the oscillator 8. It is maintained automatically, within a 20% limit, by the automatic compensation circuits which operate as follows:

Positive pulses of duration 1/(5*f*) seconds are obtained from counter thyratrons 2 and 4 of ring counter 15 and fed to the slow-down gate 3 and the speed-up gate 2 respectively. These gates may be of the pentode type wherein the potential applied to one grid controls the current-conduction characteristic of another grid to which signal is applied. Thus gates 2 and 3 receive their "opening" pulses once every T seconds, delayed in time from their corresponding separator-counter pulses by 1/(5*f*) and 3/(5*f*) seconds respectively.

The rectified signal input is admitted to the system by means of input jack 26 and fed to the differentiating circuit 1 from whose output are obtained sharp positive pulses corresponding in time to the edges of the bauds of the input multiplexed signal. This circuit may be any one of a number which are well known to those skilled in the art. Each of these positive pulses is fed to gates 2 and 3 in parallel and is passed by only that gate which has, at the instant of presentation, a positive pulse applied to it from thyratron 2 or 4 of ring counter 15. Thus if the edge of a baud of the incoming signal leads in time by more than 20% of the baud period T, its corresponding separator-counter pulse, then its corresponding positive-edge pulse is admitted through speed-up gate 2 and appears at its output as a negative pulse. This negative pulse is amplified by amplifier 4 and appears at its output as a positive pulse. This positive pulse actuates the speed-up correction circuit 6 which applies compensation to oscillator 8 to increase its frequency during the actuation time of correction circuit 6. The actuation is automatically removed from this circuit ⅘ of a cycle after its actuation by a positive pulse derived from thyratron 3 of ring counter 15 and fed to the correction circuit. A corresponding action takes place in the case of actuation of the slow-down circuit 7 which is brought about when the edge of a baud of the incoming multiplexed signal lags in time by more than 20% of a baud period T its corresponding counter pulse. In this case the actuation path is through slow down gate 3 and amplifier 5. A positive pulse obtained from tube 1 of ring counter 15 is used to remove the actuation. The nature of the correction circuits 6 and 7, as well as the type of correction which they apply to the oscillator, is left unspecified since they may be any one of many familiar to those skilled in the art. A typical example, however, is that of a thyratron with a fast-action relay in its plate circuit. When this thyratron is fired by a correction pulse from either of the amplifiers 4 or 5, it excites the relay whose contacts complete or break the circuit of a frequency-controlling circuit element to the oscillator. The thyratron is extinguished by a positive pulse applied to its cathode when the actuation of the correction circuit is ended.

Also indicated in Figure 1 is a phasing switch 14 which makes and breaks correction circuits 6 and 7 to the oscillator. This switch is manually operated to give the operator of this invention a means for properly phasing the separator ring counter to the incoming signal during initial adjustment.

It remains to explain the operation of the baud sampling and separation units of the invention: The signal is fed to the baud-sampling gate 24 which passes positive-potential (higher potential) bauds only, and these in the form of small "sampled" pulses. Each of these has only one-fifth the duration of its corresponding signal baud and occurs in an interval of time corresponding to the middle fifth of the original baud. This sampling is accomplished by gate 24 as follows: gate-opening pulses are applied once every baud cycle by thyratron 3 of ring-counter 15. These positive pulses have a time duration of $1/(5f)$ seconds and occur during intervals of time corresponding to the middle fifths of the signal bauds and at the same recurrence rate as the bauds. Gate 24 is thus opened during the occurrence of these pulses and is capable of admitting only the middle fifth of the higher-potential bauds. These sampled bauds are fed to amplifier 25 and emerge from this amplifier with the wave form shown in Figure 3. They are then fed in common to the *mn* gating-and-storage thyratrons 19 which in turn are controlled by their corresponding counter thyratrons of the separator ring-counter 18.

The thyratrons of the separator ring counter fire sequentially in the direction shown by the arrow, each thyratron firing once for each cycle of the incoming multiplexed signal for a duration of T seconds. By initial adjustments from observation of the indicator neon lamps 29, this ring counter is phased so counter thyratron *mn* (shown in Figure 1 as $CT_{mn}$), for example, fires during the interval of time at which baud mn of a cycle occurs. The separator-ring-counter tubes prime their corresponding gating-and-storage thyratrons, 19, as they fire. Thus each incoming sampled signal pulse is fed to all of the gating-and-storage thyratrons (shown in Figure 1 as $GST_1$ through $GST_{mn}$) in common, but is admitted for storage by only that thyratron which is primed when the baud occurs. Since the gating-and-storage thyratrons are primed in the identical sequence with which the bauds of the signal occur in each cycle, each baud, say *mn*, always finds its way to the same gating-and-storage thyratron—$GST_{mn}$. When a given gating-and-storage thyratron receives a sampled-signal pulse during the period when it is primed, it fires, exciting its corresponding storage relay. All of these storage-relay coils are shown in Figure 1 with the designating number 21. Each storage-relay remains excited until its circuit to positive battery is broken as explained at the beginning of this description. The voltage developed across each storage-relay coil causes its corresponding indicator neon lamp 29 to glow, indicating that the storage has taken place.

The outputs of the gating-and-storage thyratrons are connected to their corresponding storage-relay coils by means of plugboard 27. By means of this plugboard, any gating-and-storage thyratron may be connected to any of the storage-relay coils, thus providing an arrangement capable of accommodating any baud and channel configuration which may occur in the multiplexed signal. In a like manner the output of each counter thyratron of the separator ring counter connects to a separate plug of plugboard 28. By means of this plugboard, any one of the clutch-magnet thyratrons 20 may be connected to any one of the counter thyratrons. Thus any one of the clutch-magnet thyratrons may be plugged to receive an activating pulse from any one of the counter thyratrons, according to the time during the signal cycle at which it is desired to actuate the clutch magnets of the tape punches. The clutch-magnet thyratrons 20 are numbered to correspond to the tape punches whose clutch magnets they actuate. Thus as shown in Figure 1, $CMT_1$ receives its actuating pulse from $CT_{m+1}$ which fires directly after $CT_m$. In this way the clutch-magnet coil of tape punch member 1 is actuated directly after all of its storage-relay coils have been stored. As explained above, this actuation causes the tape punch to punch the proper holes, clear the storage relays, and advance the tape to a new position.

The system described above represents a typical embodiment of the invention which anyone skilled in the art can construct and operate. The tape punches used are of well-known design. They may be replaced by Teletype-printer arrangements with no change in principle in the invention. The arrangement by which gate-opening pulses are obtained in proper phase from the five thyratrons of ring-counter 15 may be replaced, for a given baud frequency by one in which delay multivibrators are used which operate from the counter pulses at the output of amplifier 17. In addition other numbers of thyratrons than five may be used in ring counter 15, with corresponding changes in phase position of the gate-opening pulses derived therefrom.

The system can be constructed with the maximum number of counter thyratrons in the separator ring counter and the maximum number of gating-and-storage thyratrons which are liable to be needed. By plugging or switching arrangements the necessary number of these thyratrons may be eliminated from the circuit to provide only the number necessary to accommodate a given incoming multiplexed signal.

Referring now to Figure 5, the operation of the baud-separation thyratrons and gating-and-storage circuit is as follows: Figure 5 is the circuit diagram of a typical embodiment of the system. It consists of a ring counter made up of *mn* thyratrons labeled $CT_1$ through $CT_{mn}$ and gating-and-storage thyratrons labeled $GST_1$ through $GST_{mn}$. Other circuits may be employed using vacuum tubes instead of thyratrons. In the plate circuits of the gating-and-storage thyratrons are storage-relay coils $Re_1$ through $Re_{mn}$. This circuit diagram, as well as the explanation which follows, represents elaborations of units 18, 19, and 21 of Figure 1. For simplicity plugboard 27 is omitted as well as the clutch-magnet coils 22 and their contacts 23, it being understood that the present circuit operates subject to their being in the circuit.

The shield grid of each gating-and-storage thyratron is connected through a resistor network, $R_1R_2R_3$, to the cathode of its corresponding ring-counter thyratron. When a given ring-counter thyratron is unfired, its cathode is at ground potential, and a sufficiently large negative voltage is applied by battery $B_2$ or a corresponding electronic power supply through resistors $R_2$ and $R_3$ to the shield grid of its corresponding gating-and-storage thyratron to keep the latter thyratron from firing, regardless of the magnitude of the negative voltage applied to its control grid. When the given ring-counter thyratron is fired, however, its cathode rises sharply to a positive potential above ground, depending mainly upon the magnitude of the voltage of $B_3$, raising the shield-grid potential of its corresponding gating-and-storage thyratron. Under this condition the gating-and storage thyratron has a "priming" voltage on its shield grid. With this priming voltage applied, the gating and storage thyratron is capable of firing if the negative potential applied to its control grid is sufficiently small in magnitude.

The ring counter is actuated by counter pulses applied in common to the control grids of all the ring-counter thyratrons through condensers $C_2$. The operation of this type of counter circuit is well-known to those skilled in the art. Thus as each new counter pulse occurs, provided one ring-counter thyratron is fired, the succeeding ring-counter thyratron fires, automatically extinguishing the originally-fired thyratron, and priming the next thyratron to its left in the diagram. In this way a new ring-counter thyratron fires for each counter pulse which occurs, and the count progresses in the direction shown with the tubes firing and extinguishing sequentially to the left in the direction of the arrow shown in Figure 5.

In this invention the counter pulses are fed to the ring counter from amplifier 17 of Figure 1. Their wave form is illustrated in Figure 4. As shown, these pulses have a recurrence period of T seconds which is equal to the baud duration of the incoming signal. Thus as the ring-counter operates, each thyratron is fired for a total of T seconds for each complete cycle which the ring counter executes. In this manner each gating-and-storage thyratron is primed for T seconds out of each ring-counter cycle, this priming taking place along with the firing of its associated ring-counter thyratron.

Referring to Figure 2, it is seen that the bauds for a single cycle of the multiplexed signal are labeled with numbers 1 through *mn*. Corresponding to the leading edges of these bauds in time are the counter pulses, also labeled with corresponding numbers. Thus during a multiplexed-signal cycle, *mn* bauds and *mn* counter pulses occur, the counter pulses being adjusted to occur at instants corresponding to the occurrence of the leading edges of their corresponding bauds as explained above. The bauds are shown as consisting of alternately high and low potentials merely for the sake of convenience, as explained earlier.

The firing of the ring-counter thyratrons is adjusted so that thyratron $CT_1$ is fired during the interval of time at which baud 1 occurs, thyratron $CT_2$ is fired during the interval of time at which baud 2 occurs, and so on throughout the cycle of *mn* bauds and ring-counter thyratrons. Thus gating-and-storage thyratron $GST_1$ is primed during the interval of time at which baud 1 occurs, $GST_2$ is primed during the interval of time at which baud 2 occurs, and so on.

By means of battery $B_1$ (or a suitable electronic direct-current power supply) a negative voltage of sufficiently large magnitude is applied to the control grids of all the gating-and-storage thyratrons to prevent their firing in the absence of any other potential applied to these grids. The multiplexed signal, in its sampled form as illustrated in Figure 3 and explained above, is applied to the control grids of all of these gating-and-storage thyratrons simultaneously through condensers $C_1$. When a baud pulse of higher potential (e. g., number 1 of Figure 3) occurs, its voltage, added to that of $B_1$, is sufficient to fire any one of the gating-and-storage thyratrons if, and only if, it is primed by its corresponding ring-counter thyratron during the time interval at which this baud occurs. When a given gating-and-storage thyratron fires under this condition its plate current flows through its corresponding storage-relay coil, causing actuation of this relay's contacts and movable parts. When this is done, the storage of the baud is complete, relay actuation corresponding to a baud of high potential, and no relay actuation corresponding to a baud of lower potential. In Teletype terms: marks are stored as relay actuation, while spaces are stored as lack of relay actuation, provided, of course, that mark corresponds to higher baud potential.

Whenever a given storage-relay is actuated, the voltage developed across its coil is sufficient to cause its corresponding neon indicator lamp to glow. This gives an indication of where marks are occuring in the cycle which can be used for initially phasing the system.

To summarize, it is seen that the incoming multiplexed signal is directed to all the control grids of the gating-and-storage thyratrons which are primed at a rate identical with the recurrence rate of the bauds of the incoming signal. An incoming mark, fires only the gating-and-storage thyratron which is primed for the time interval during which it occurs. Thus the $n_i$th baud of each cycle of the signal is always stored in the storage relay of the $n_i$th gating-and-storage thyraton. $n_i$ here is a number referring to any between 1 and *mn*. In this way each baud of the incoming signal cycle always finds its way to its corresponding storage relay. In this manner the demultiplexing action takes place.

The invention described herein may be manufactured and used by or for the Government of the United States for governmental purposes without the payment of any royalty thereon or therefor.

What is claimed is:

1. In a system for receiving time-division multiplexed signals, a variable frequency oscillator for producing operating pulses, timing means for producing a plurality of individualized impulses in response to said operating pulses, a plurality of individualized selector means each responsive to produce a signal pulse upon the simultaneous application thereto of a timing impulse and a signal, a circuit for interconnecting said timing means and individualized selector means respectively to apply timing impulses to said selector means, a plurality of individualized receiving means, means including switching means for interconnecting said selector means with a desired portion of said individualized receiving means, and means to apply the signal pulses to the selector means, whereby the selected receiving means respond to selected portions of said multiplied signals.

2. In a receiver for time-divided multiplexed signals, a plurality of receiving devices adapted to receive impulse signals, a plurality of electronic gating tube circuits adapted to transmit an operating impulse upon simultaneous application thereto of a pulse signal and a gating pulse, an electronic ring counter comprising a plurality of electronic tubes adapted to produce a series of gating pulses in order, circuit means including switching means for selectively interconnecting said receiving devices and said gating tube circuits in a preselected order, second circuit means for interconnecting said gating tubes and said electronic tubes of said ring counter, a variable frequency pulse-forming oscillator for producing operating pulses, means to apply said operating pulses to said ring counter to sequentially operate said electronic tubes, and means to apply said pulse signals to said gating tubes, whereby said receiving devices receive operating impulses from said pulse signals in a preselected order.

3. In a receiver for time-divided multiplexed pulse signals, a plurality of individualized receiving devices adapted to respond to a voltage pulse, a plurality of electronic gating tubes adapted to transmit a voltage pulse upon the simultaneous application of a gating voltage and a signal pulse, selector circuit means including switching means for interconnecting the said electronic gating tubes and a desired portion of said individualized receiving devices in a desired sequence, a ring counter circuit comprising a plurality of electronic tubes sequentially operated by a series of operating pulses and each producing a gating voltage when operated, circuit means connecting said electronic gating tubes and said ring counter circuit, an operating pulse generator comprising a variable frequency oscillator whose frequency is controlled by the pulse rate of the multiplied signal, means for applying the operating pulse output of said variable frequency oscillator to said ring counter circuit, and means for applying the multiplexed signal to said selector circuit, whereby the selected receiving devices respond to the desired portion of the multiplexed pulsed signal in a desired sequence.

WILLIAM C. NORRIS.
LAWRENCE R. STEINHARDT.
FRED L. RIBE.

REFERENCES CITED

The following references are of record in the file of this patent:

UNITED STATES PATENTS

| Number | Name | Date |
|---|---|---|
| 1,658,516 | Daine | Feb. 7, 1928 |
| 2,099,065 | Holden | Nov. 16, 1937 |
| 2,302,535 | Durbin | Nov. 17, 1942 |
| 2,317,995 | Krum | May 4, 1943 |
| 2,365,450 | Bliss | Dec. 19, 1944 |